United States Patent
Sumner et al.

(10) Patent No.: US 8,230,021 B2
(45) Date of Patent: Jul. 24, 2012

(54) SYSTEMS AND METHODS FOR CREATING PROGRAMMABLE REPLY FUNCTIONS FOR AN INSTANT MESSAGING CLIENT

(75) Inventors: Charles Sumner, Boca Raton, FL (US); Andrea L. Snow-Weaver, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

(21) Appl. No.: 11/566,066

(22) Filed: Dec. 1, 2006

(65) Prior Publication Data

US 2008/0129469 A1 Jun. 5, 2008

(51) Int. Cl.
*G06F 15/16* (2006.01)
*H04L 12/58* (2006.01)
*H04M 3/42* (2006.01)
*H04W 4/00* (2009.01)

(52) U.S. Cl. ..... 709/206; 709/207; 709/233; 455/412.1; 455/414.1; 455/466

(58) Field of Classification Search .................. 709/206, 709/207, 233; 455/412.1, 466, 414.1
See application file for complete search history.

(56) References Cited

U.S. PATENT DOCUMENTS

| | | | | |
|---|---|---|---|---|
| 5,533,184 A * | 7/1996 | Malcolm | ....... | 715/762 |
| 6,609,146 B1 * | 8/2003 | Slotznick | ....... | 709/200 |
| 7,225,409 B1 * | 5/2007 | Schnarel | ....... | 715/747 |
| 2003/0122870 A1 * | 7/2003 | Aggarwal et al. | ....... | 345/760 |
| 2004/0019487 A1 * | 1/2004 | Kleindienst et al. | ....... | 704/270.1 |
| 2006/0025091 A1 * | 2/2006 | Buford | ....... | 455/154.2 |
| 2006/0123089 A1 * | 6/2006 | Cahn et al. | ....... | 709/206 |
| 2007/0055729 A1 * | 3/2007 | Lyle et al. | ....... | 709/204 |

* cited by examiner

*Primary Examiner* — Philip Chea
*Assistant Examiner* — Peter Shaw
(74) *Attorney, Agent, or Firm* — Novak Druce + Quigg LLP

(57) ABSTRACT

A method for adding a customizable reply function to an interface in an instant messaging (IM) client, including the steps of identifying a string of characters to be associated with the reply function, choosing an action of the IM client to be associated with the reply function, selecting presentation characteristics of a representation of the reply function in the interface of the IM client, and incorporating the reply function into the interface of the IM client, where a subsequent user selection of the incorporated representation of the reply function in the IM client interface instructs the IM client to output the string of characters associated with the reply function and to perform an action associated with the reply function.

12 Claims, 3 Drawing Sheets

SYSTEMS AND METHODS FOR CREATING PROGRAMMABLE REPLY FUNCTIONS FOR AN INSTANT MESSAGING CLIENT

FIELD OF THE INVENTION

The present invention is related to the field of instant messaging and more particularly, instant messaging client interfaces.

BACKGROUND OF THE INVENTION

Instant messaging (IM) or chat services allow users to send instant text messages to each other through the Internet or a company intranet. Such services have become popular, particularly because although the communication between two users is interactive, like a telephone call, the users can perform other tasks between the sending and receiving of messages.

Most IM clients provide two text areas—one where a user types messages they want to send and another where received and sent messages are displayed. Sending a message generally involves typing the message and then selecting a "Send" button or pressing the Enter key on a keyboard. When an incoming message is received, some instant messaging clients automatically display the instant messaging window on top of other applications that are currently in use by a recipient of an instant message. The recipient can then type a response and have the IM client send the message. Afterwards, the recipient minimizes or closes the instant messaging window and continues with his previous task.

Some IM clients provide shortcut icons which can be used to enter simple pre-programmed responses rather than having to type the entire message every time. For example, in some instant messaging clients, buttons may be provided that allow a user to respond "yes" or "no" with a single action. Users generally cannot, however, change the text to be inserted or create customized icons of their own.

In general, whenever an instant message arrives, it constitutes an interruption requiring the recipient to stop working on his current task, type a message, send the message, and minimize the instant messaging client. While responding to an instant message is generally not necessarily burdensome on users, for some, such as those with disabilities, it can be especially burdensome and time consuming to reply to the instant message and return to the previous task, especially when such users may not be able to use a keyboard or other input devices efficiently.

Therefore there is a need for systems and methods for providing customization for IM client interfaces, particularly the ability to add preprogrammed responses. There is also a need to automate the various steps involved in sending out a response to an another IM client user and in particular, reducing the number of user steps involved in responding to an IM message when the user is engaged in other tasks.

SUMMARY OF THE INVENTION

A customization module is provided for a user to add a customizable reply function to an interface of an instant messaging (IM) client, which can include logic for a user to identify a string of characters to be associated with the reply function, to choose at least one action of the IM client to be associated with the reply function, to select one or more presentation characteristics of a representation of the reply function in the interface of the IM client; and to incorporate the reply function into the interface of the IM client, where a subsequent user selection of the incorporated representation of the reply function in the IM client interface instructs the IM client to output the string of characters associated with the reply function and to perform at least one action associated with the reply function.

In some embodiments the string of characters can include a static portion and a variable portion. In some embodiments, the variable portion comprises an instruction for the IM client to query a user for information or a calculated string of characters.

In some embodiments, the module can include logic for a user to select one or more circumstances to make the reply function available in the interface of the IM client. In other embodiments, the module can include logic for a user to select as an action an instruction for the IM client to minimize an IM client interface. In some embodiments, the module can also include logic for the user to designate an alternate user action that initiates the reply function.

Other embodiments, when configured in accordance with the inventive arrangements disclosed herein, can include methods or computer-readable storage medium having computer code for performing the various processes and processes disclosed herein.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION

The invention disclosed herein provides for systems and methods for customizing the interface of an instant messaging (IM) client. More particularly, a module is provided that allows a user to incorporate a customized reply function into the interface of the IM client that automatically outputs a response to an instant message when the function is activated by a user. In the various embodiments, any characters that can be included in a normal response in the IM client can be included in the automated response. In the various embodiments, the characters can include letters, numbers, or symbols. As referred herein, symbols can comprise both textual and graphically symbols, including symbols providing links to one or more applications. In the various embodiments, the response can be tailored for particular types of responses or recipients. The interface can also be customized only to display appropriate functions under pre-defined circumstances. In the various embodiments, the custom reply function can be created using a module, separate or incorporated into the IM client, or be defined by use of program code.

Figure 1:
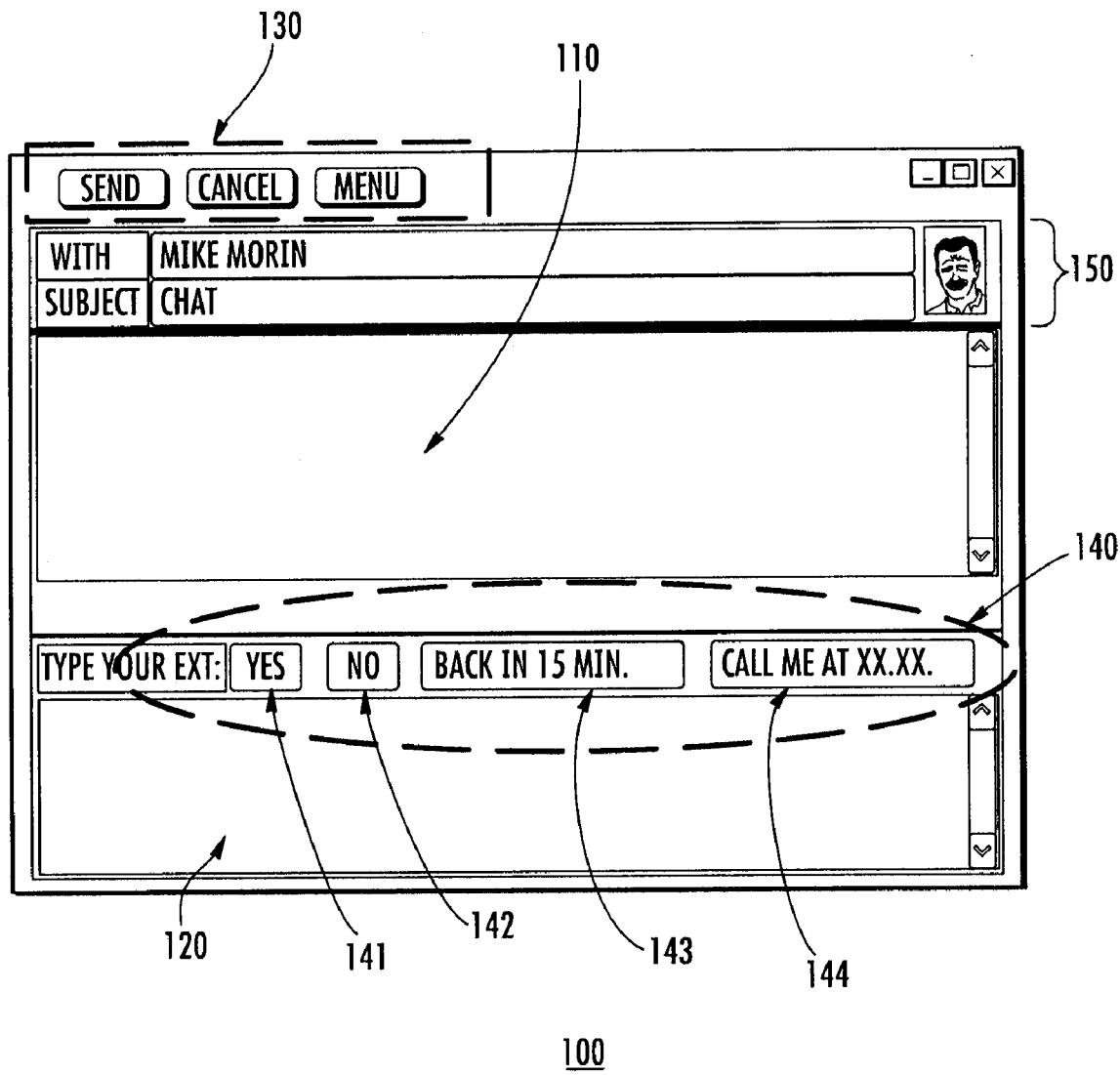
FIG. 1 is an illustration of an instant messaging client interface typical in the prior art.

With reference now to the figures, FIG. 1 depicts a pictorial representation of the interface of an IM client 100 in accordance with an embodiment of the invention. The IM client interface 100 comprises of a text response area 110, showing the IM conversation, a text typing area 120, for inputting text to be sent, a menu 130, and one or more function buttons or icons 140. In the various embodiments, the IM client interface 100 also include identifying information 150, which identifies the party with which the user is currently chatting using the IM client interface 100. In the prior art, the interface is typically fixed and the user is unable to modify or customize the interface as desired. In some cases, small modifications, such as adding buttons to output short, commonly used phrases may be available, such as "yes" or "no" buttons 141, 142 as shown in FIG. 1.

The present invention provides tools and methods for overcoming the limitations of current IM clients. In the various embodiments of the invention, customized reply functions can be added to the IM client interface 100, allowing the user to automatically respond to a large number of different received instant messages with a only a few actions, or even just a single action. In one embodiment of the invention, the customization module can walk a user through a series of steps to create and incorporate a new reply function into the IM client interface 100, as shown in the exemplary process flow in FIG. 2.

Figure 2:
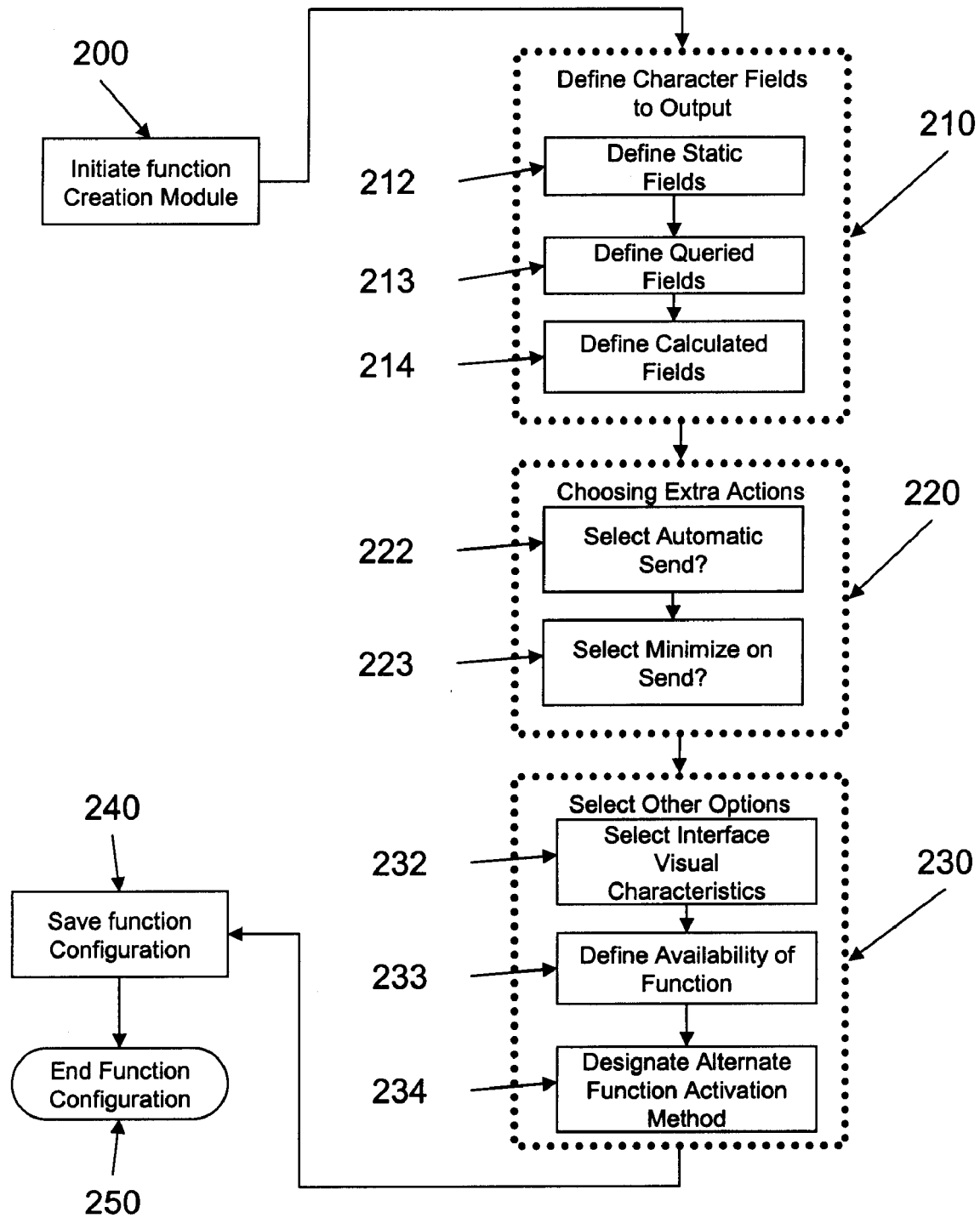
FIG. 2 is an illustration of an exemplary process flow for a customization module in accordance with an embodiment of the present invention.

FIG. 2 shows an exemplary process flow for a customization module for the creation of a new reply function in accordance with the present invention. An exemplary process flow for a module or method in accordance with the present invention can be described by steps 200, 210, 220, 230, and 240. First, the module is initialized in step 200. In the illustrated embodiment, the module can comprise a module initialized from within the IM client itself or a module executing or operating separately from the IM client. Next, the IM client can lead a user through the basic steps of configuring a new reply function, in particular, identifying text to output, step 210, choosing other actions for the IM client to perform, step 220, and selecting other options for the new response function, step 230. After the main steps are completed, the utility can save the configuration options and incorporates the changes into the IM client interface 100, step 240, and the module can terminate, step 250.

The module can alternatively comprise a single interface in which the user selects the options he wishes to associate with a new reply function. Therefore, in the various embodiments, the steps or tasks involved in a configuration of a new reply function need not be in a specific order and the flow shown in FIG. 2 is presented by way of example, not by way of limitation. It can also be appreciated that in some embodiments, a executable module may not be used at all and rather program code defining the new response function may be described in program code which can be incorporated into a configuration file of the IM client or the IM client itself or otherwise be made available for the IM client to access and alter the IM client interface accordingly. In the various embodiments, the reply function may also be modified or updated by the user by using the module or inserting new program code to update or modify the reply function.

In the various embodiments, the invention provides automatic output a string of characters in an IM text typing area 120 to send to a recipient. As previously discussed, the string of characters can comprise a series of letters, numbers, and/or symbols. Additionally, it is contemplated in this disclosure that separate reply functions can include a string of characters comprising a message in different languages.

In the present invention, in step 210, a user can enter how the user wishes the string to be constructed. For example, as shown in the illustrated embodiment in FIG. 2, the user can have the option to use several different types of fields of characters for the output string of text. In some embodiments, the user can define fields comprising a static portion, step 212. Such fields include sequences of characters which are fixed, such that whenever the reply function is activated, the content of the fields is preset and automatically output by the IM client without any further user intervention. In other embodiments, the user can define variable fields, which can comprise fields which can include calculated portions and/or queried portions. In such embodiments, the calculated portions can define a user-defined or system-defined formula that instructs the IM client to perform one or more steps in order to generate the characters to insert in the field. For example, for an instant message constructed to output "call me at XX:XX", the user may define the "XX:XX" portion as a calculated field that can comprise a formula that calculates time based on a predefined interval of time defined by the user. Therefore, if the user defines the interval to be one hour, the formula would instruct the IM client to retrieve the current time, add one hour, and insert the result into the string. In some embodiments, the calculated field may rely on the recipient of the message, adjusting the contents of fields accordingly. For example, a message may be automatically translated into a different language for a foreign speaking recipient.

In embodiments with a queried portion, the queried portion defines a field that instructs the IM client to query a user for a specific entry. For example, for an instant message constructed to output "call me at XX:XX", the user may define the "XX:X" portion as a queried field that can comprise a question for the user. Therefore, the field would instruct the IM client to ask the user for the string to be inserted, and insert the answer into the string to be outputted. In such embodiments, once the field information is entered during operation, the IM client would compose and send the message including the entered information. It can be appreciated that in some embodiments, queried fields do not necessarily require a user to type in a response. In such embodiments, the user may also pre-define a list of choices in step 213 for the queried field, allowing the user to more quickly and efficiently construct the reply and return to his previous task.

In the some embodiments, it is contemplated that a user, along with defining a string comprising a message, can also choose to include applications or links to applications or other resources as part of the response. In some embodiments, it is also contemplated that a user could forward a reply function created by the user to a recipient, allowing the recipient to incorporate the forwarded reply function into the recipient's IM client interface 100.

In the various embodiments, in addition to defining the contents of the instant message, the module can also allow the user to define or select extra actions to be associated with a new reply function, step 220. In some embodiments, the response function can be configured to automatically send the message without any opportunity for the user to add or edit the response, step 222. In other embodiments, the response function can be configured to automatically minimize the IM client interface 100 after the instant message is constructed and sent, step 223. It can be appreciated that in the various embodiments, the reply function can be configured to perform one or more functions of the IM client. An inclusion of one or more extra actions is advantageous in the various embodiments, as the user can reply to an instant message and automatically minimize the IM client interface 100 in a single act.

Once the functioning of the reply function is configured by a user, other configuration options of the reply function can also be selected, step 230. In some embodiments, an option can comprise selecting how the reply function is presented in the IM client, step 232. For example, the user can be presented with an option of selecting whether to display the response function as an additional buttons 143, 144 or icons or whether to include the new reply function in the user menu 120 in the IM client. It can be appreciated that the user could also select other display options including, but not limited to, icon or button design, colors, text, and position or location.

In some embodiments, another configuration option can be configuring the availability of the reply function in the IM client interface to be variable, depending on one or more criteria defined by a user, step 233. For example, the IM client interface 100 can be configured to display a reply function based on the other party in the IM conversation. In such embodiments, some phrases may be inappropriate or meaningless to one party, but be appropriate or meaningful to another party. In such embodiments, a user can identify one or more instant messaging parties to associate with a new reply function and the IM client would only make the reply function available in the IM client interface 100 when engaged in an IM conversation with such parties. However, the invention is not limited in this regard and this disclosure contemplates that in other circumstances only a limited subset of the reply functions may be made available to the user. It can also be appreciated that in the various embodiments, the IM client interface 100 can be configured to make the function unavailable by simply not presenting the function in the IM client interface 100 or by deactivating the function in the IM client interface 100.

In some embodiments, another configuration option can comprise allowing a user to define alternate means for activating a reply function, step 234. In some embodiments, a user may enter, for example, a combination of keys that activate a reply function. In such embodiments, it is contemplated that such combination of keys can comprise a shortcut that activates the reply function. In other embodiments, it is contemplated that a user can type a shortcut phrase into the text typing area, which the IM client would recognize and execute as a reply function. In yet other embodiments, a user may associate a speech command with a reply function. In other embodiments, a speech recognition module could be used as an alternative means to activate one or more reply function. Such embodiments can allow an IM client interface 100 in accordance with the present invention to comply with any accessibility standards.

The examples provided for the configuration options are presented by way of example, not by way of limitation, and it is contemplated that other types of configuration options which affect the presentation, availability, or functioning of one or more reply functions are available in the various embodiments of the invention.

After the reply function has been configured, the module stores the various settings for the new reply function, step 240. As previously discussed, in some embodiments, the configuration for the new reply function may be stored as part of a configuration file accessible by the IM client. In other embodiments, the configuration for the reply function is stored in the IM client itself and integrated into the application. However, the invention is not limited in this regard and it is contemplated by this disclosure that other methods of storing user preferences for an application may be utilized in the various embodiments.

It is further contemplated by this disclosure that configuration information for a new reply function may be stored locally or remotely, depending on the location and/or operation of the IM client. For example, in embodiments where the IM client is a network application running in a web browser or a java applet, the configuration for the new reply function can be stored remotely on an IM server, allowing the user to access the reply function on any client having access to the IM server. Such an embodiment is presented by way of example, not by way of limitation.

Figure 3:
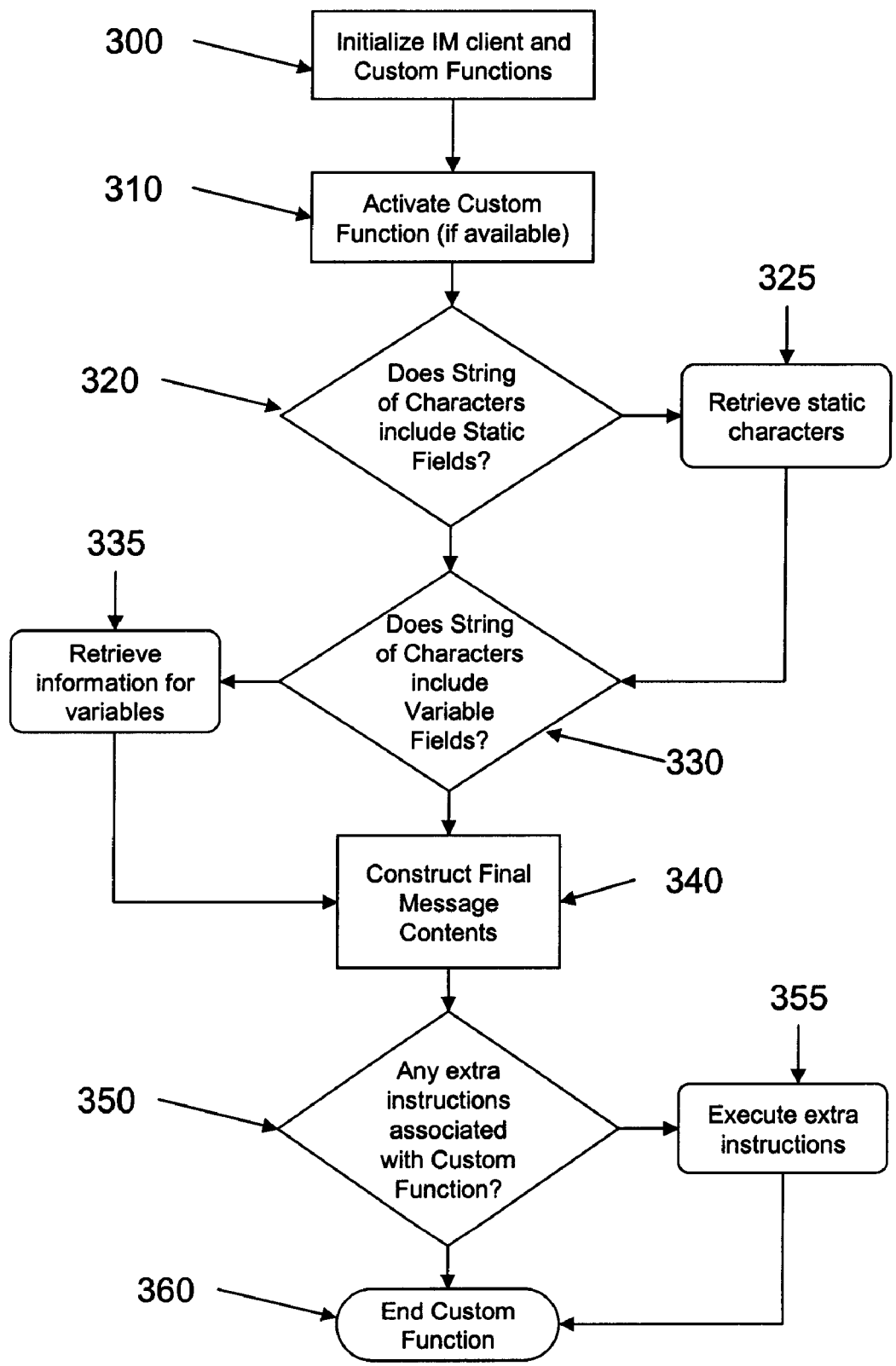
FIG. 3 is an illustration of an exemplary process flow for execution of a customized function created with a customization module in accordance with an embodiment of the present invention.

Once the IM client has been updated with the new reply function, the user can utilize the customized reply functions in the IM client application. Customized buttons 143, 144, for example would be available in the IM client interface 100 and could be executed as desired by the user. A exemplary process flow for the functioning of the customized reply functions within an IM client interface 100 in accordance with an embodiment of the present invention is shown in FIG. 3.

First, a user can activate the IM client, which displays one or more reply functions created by the user, 143, 144, in the IM client interface. During initialization, the IM client can retrieve the configuration associated with each user defined reply function. The IM client then waits for an instant message to be received. Typically, most IM clients are configured to notify the user of a receipt of an instant message by visual or audio means and in some cases by prioritizing the IM client interface 100 over other applications on a user terminal. In some embodiments, an application window of the IM client may be superimposed over the application windows of other currently running applications on the user terminal. Once an instant message is received, step 300, the IM client can determine whether or not to make the reply function available, depending on the recipient and the user configuration information for the reply function, step 305.

Next, a user can activate a reply function in the IM client interface 100, if available, to reply to an instant message, step 310. In the various embodiments, as previously described, the user can select a reply function by activating a button or icon on the IM client interface 100, or by selecting a menu item in the IM client interface 100. Alternatively, the user, as previously discussed, could press a shortcut key or key, enter a short phrase, or enter a voice command associated with the reply function. However, as previously discussed, depending on the intended recipient of the instant message, the IM client may limit the user as to which reply functions he can choose from to activate.

Afterwards, upon selection of a reply function, the IM client can determine the information necessary for constructing the automated response. First, the IM client can determine if there are any static fields, step 320, and if necessary, retrieve the static portions for the outgoing message, step 325. Second, the IM client can determine if variable fields for the string of characters to be outputted need to be populated, step 330. If variable fields exist, the IM client determines how to populate the fields properly, step 335. As previously discussed, variable fields can include calculated fields in which the content is determined dynamically depending on one or more criteria predefined by a user. The variable fields can also include queried fields, in which the IM client can directly query the user to provide information for the field. As previously discussed, in some embodiments the entry for the queried fields can comprise characters entered by the user or a selection by the user from a list of possible entries. Once the calculated and queried fields are populated, they can be combined with the static fields to construct the message to be sent to the intended recipient, step 340. As previously stated, the completed message can comprise any combination of letters, numbers, and/or symbols. For example, when a user constructs a message "call me at XX:XX", the message is made up of a static field, "call me at", and a variable field, "XX:XX". Upon execution of the reply function "call me at XX:XX", the IM client would recover the static field contents, query the user for the time, combine the two fields appropriately, and output the message in the IM client interface 100.

Finally, once the message is constructed, the IM client determines whether the IM client must execute any commands, step 350, and begins to execute one or more commands associated with the IM client and defined in reply function, step 355. In the various embodiments, as previously described, the commands may comprise simply automatic transmittal of the message or minimizing of the IM client interface 100. However, it is also contemplated that other commands of the IM client may also be executed automatically. For example, in the case where a user always reports the contents of an IM conversation to a second IM recipient, the reply function that terminates the first conversation may be configured to automatically begin a second conversation with the second IM recipient.

The present invention may be realized in hardware, software, or a combination of hardware and software. The present invention may be realized in a centralized fashion in one computer system, or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for adding a customizable reply function to an interface in an instant messaging (IM) client, the method comprising:
  creating a customized reply function for automatically creating and sending a reply message to a received message at the IM client by:
    initiating a reply function creation module, wherein the reply function creation module is initiated from within the IM client;
    within the module, prompting a user to define a string of characters to be associated with the customized reply function, the prompting comprising requesting a user to specify for the string of characters a static portion including a fixed sequence of characters and a variable portion, the variable portion including at least one of a queried portion and a calculated portion, wherein the queried portion includes an instruction for the IM client to query the user for information to be inserted into the string and the calculated portion defines a formula that instructs the IM client to perform one or more steps to generate characters to be inserted into the string of characters;
    within the module, prompting the user to choose at least one action of the IM client to be associated with the customized reply function, wherein the at least one action is in addition to the action of automatically sending the reply message using the customized reply function and is performed together with the action of sending the reply message, the at least one action comprising automatically minimizing the IM client after the reply message is sent; and
    within the module, prompting the user to select one or more other options for the customized reply function comprising presentation characteristics of a representation of the customized reply function in the interface of the IM client one or more IM session criteria specifying when the representation of the customized reply function will be available in the interface of the IM client, and at least one alternate method for activating the customized reply function in the interface of the IM clients via one of a keyboard input or a speech input; and
  incorporating the customized reply function into the interface of the IM client,
  whereby the representation of the customized reply function, with the presentation characteristics, is made available if the IM session criteria are met and a subsequent user selection of the incorporated representation of the reply function in the IM client interface instructs the IM client to output the string of characters associated with the customized reply function and to perform the at least one action associated with the customized reply function.

2. The method of claim 1, wherein requesting the user to specify the variable portion further comprises requesting the user to define the queried portion using a pre-defined list of choices to present to the user when the representation of the customized reply function is made available.

3. The method of claim 1, wherein requesting the user to specify the calculated portion further comprises requesting the user to define the calculated portion to specify a time to be included in the reply message based on a pre-defined time interval.

4. The method of claim 1, wherein requesting the user to specify the variable portion further comprises requesting the user to define the calculated portion to comprise instructions for determining a language of the recipient of the reply message and translating at least a portion of the reply message portion the language of the recipient.

5. A non-transitory machine readable storage having stored thereon, a computer program having a plurality of code sections, said code sections executable by a machine for causing the machine to perform the steps of:
  creating a customized reply function for automatically creating and sending a reply message for a message received in an instant messaging (IM) client by:
    initiating a reply function creation module, wherein the reply function creation module is initiated from within the IM client;
    within the module, prompting a user to define a string of characters to be associated with the customized reply function, the prompting comprising requesting a user to specify for the string of characters being constructed using a static portion including a fixed sequence of characters and a variable portion, the variable portion including at least one of a queried portion and a calculated portion, wherein the queried portion includes an instruction for the IM client to query the user for information to be inserted into the string and the calculated portion defines a formula that instructs the IM client to perform one or more steps to generate characters to be inserted into the string of characters;

within the module, prompting the user to choose at least one action of the IM client to be associated with the customized reply function, wherein the at least one action is in addition to the action of automatically sending the reply message using the customized reply function and is performed together with the action of sending the reply message, the at least one action comprising automatically minimizing the IM client after the reply message is sent;

within the module, prompting the user to select one or more other options for the customized reply function comprising presentation characteristics to be associated with a representation of the customized reply function in the interface of the IM client one or more IM session criteria specifying when the representation of the customized reply function will be available in the interface of the IM client, and defining at least one alternate method for activating the customized reply function in the interface of the IM clients via one of a keyboard input or a speech input; and incorporating the customized reply function into the interface of the IM client, whereby the representation of the reply function, with the presentation characteristics, is made available if the IM session criteria are met and a subsequent user selection of the incorporated representation of the customized reply function in the IM client interface instructs the IM client to output the string of characters associated with the reply function and to perform the at least one action associated with the customized reply function.

6. The non-transitory machine readable storage of claim 5, wherein requesting the user to specify the variable portion further comprises requesting the user to define the queried portion using a pre-defined list of choices to present to the user when the representation of the customized reply function is made available.

7. The non-transitory machine readable storage of claim 5, wherein requesting the user to specify the calculated portion further comprises requesting the user to define the calculated portion to specify a time to be included in the reply message based on a pre-defined time interval.

8. The non-transitory machine readable storage of claim 5, wherein requesting the user to specify the variable portion further comprises requesting the user to define the calculated portion to comprise instructions for determining a language of the recipient of the reply message and translating at least a portion of the reply message portion the language of the recipient.

9. A system for generating customized reply functions for an instant messaging (IM) client comprising:
at least one memory; and
at least one processor configured to include a reply function creation module for automatically creating and sending a reply message to a received message at the IM client, initiated from within the IM client, having the logic for creating a customized reply function by:

querying a user to define a string of characters to be associated with the customized reply function, the prompting comprising requesting a user to specify for the string of characters being constructed using a static portion including a fixed sequence of characters and a variable portion, the variable portion including at least one of a queried portion and a calculated portion, wherein the queried portion includes an instruction for the IM client to query the user for information to be inserted into the string and the calculated portion defines a formula that instructs the IM client to perform one or more steps to generate characters to be inserted into the string of characters;

querying the user to choose at least one action of the IM client to be associated with the customized reply function, wherein the at least one action is in addition to the action of automatically sending the reply message using the customized reply function and is performed together with the action of automatically sending the reply message, the at least one action comprising automatically minimizing the IM client after the reply message is sent; and querying a user to select one or more other options for the customized reply function comprising presentation characteristics to be associated with a representation of the customized reply function in the interface of the IM client one or more IM session criteria specifying when the representation of the customized reply function will be available in the interface of the IM client, and defining at least one alternate method for activating the customized reply function in the interface of the IM clients via one of a keyboard input or a speech input; and incorporating the customized reply function into the interface of the IM client, whereby the representation of the customized reply function, with the presentation characteristics, is made available if the IM session criteria are met and a subsequent user selection of the incorporated representation of the customized reply function in the IM client interface instructs the IM client to output the string of characters associated with the customized reply function and to perform the at least one action associated with the customized reply function.

10. The system of claim 9, wherein requesting the user to specify the variable portion further comprises requesting the user to define the queried portion using a pre-defined list of choices to present to the user when the representation of the customized reply function is made available.

11. The system of claim 9, wherein requesting the user to specify the calculated portion further comprises requesting the user to define the calculated portion to specify a time to be included in the reply message based on a pre-defined time interval.

12. The system of claim 9, wherein requesting the user to specify the variable portion further comprises requesting the user to define the calculated portion to comprise instructions for determining a language of the recipient of the reply message and translating at least a portion of the reply message portion the language of the recipient.

* * * * *